July 24, 1934.   R. L. HIBBARD   1,967,508
MACHINE FOR THREADING COUPLINGS
Filed March 5, 1934   3 Sheets-Sheet 3

INVENTOR
ROBERT L. HIBBARD
BY James C. Bradley
ATTORNEY

UNITED STATES PATENT OFFICE 1,967,508

MACHINE FOR THREADING COUPLINGS

Robert L. Hibbard, Pittsburgh, Pa., assignor of one-half to William K. Stamets, Pittsburgh, Pa.

Application March 5, 1934, Serial No. 714,087

7 Claims. (Cl. 10—105)

Figure 1:
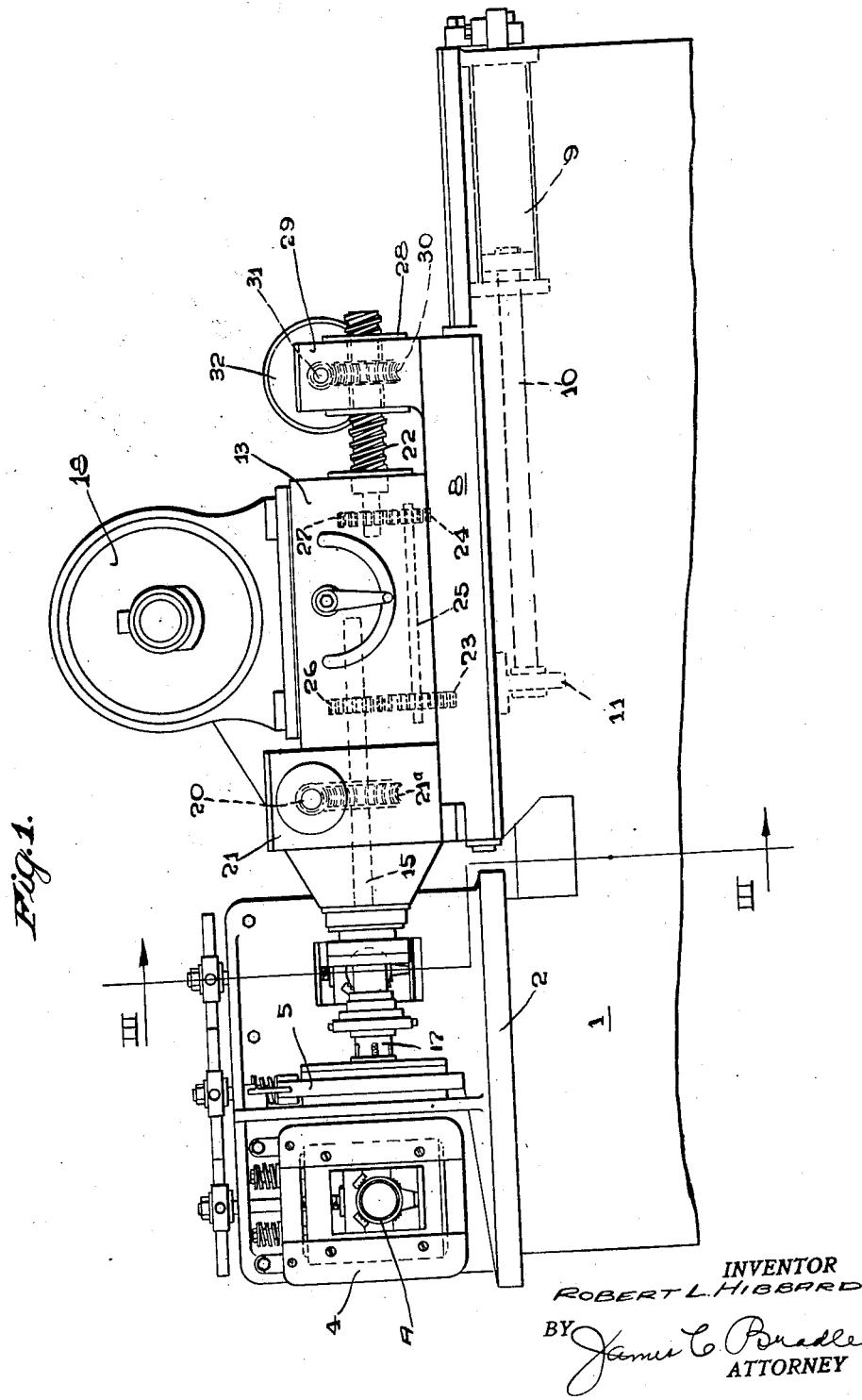
Figure 2:
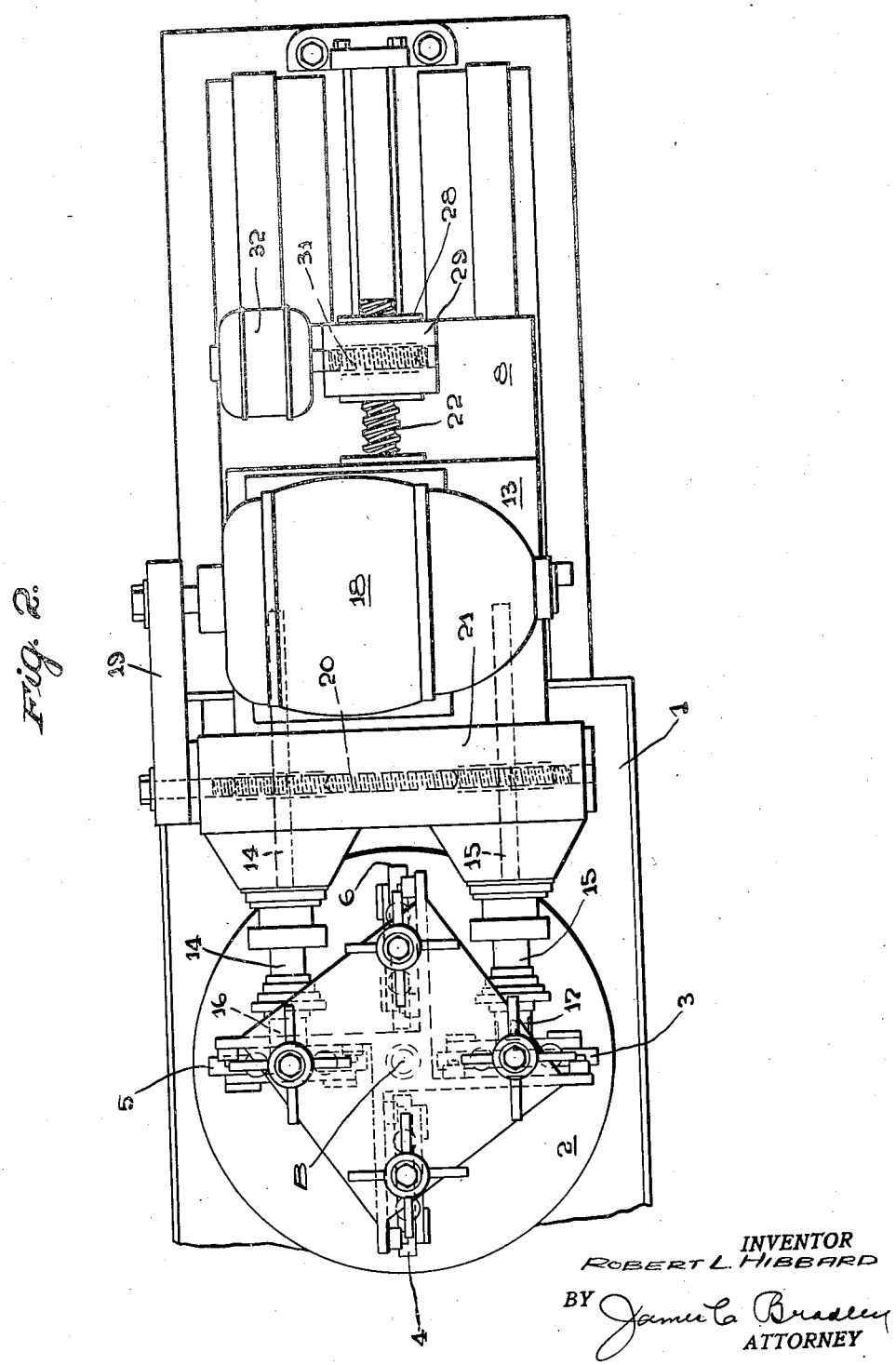
Figure 3:
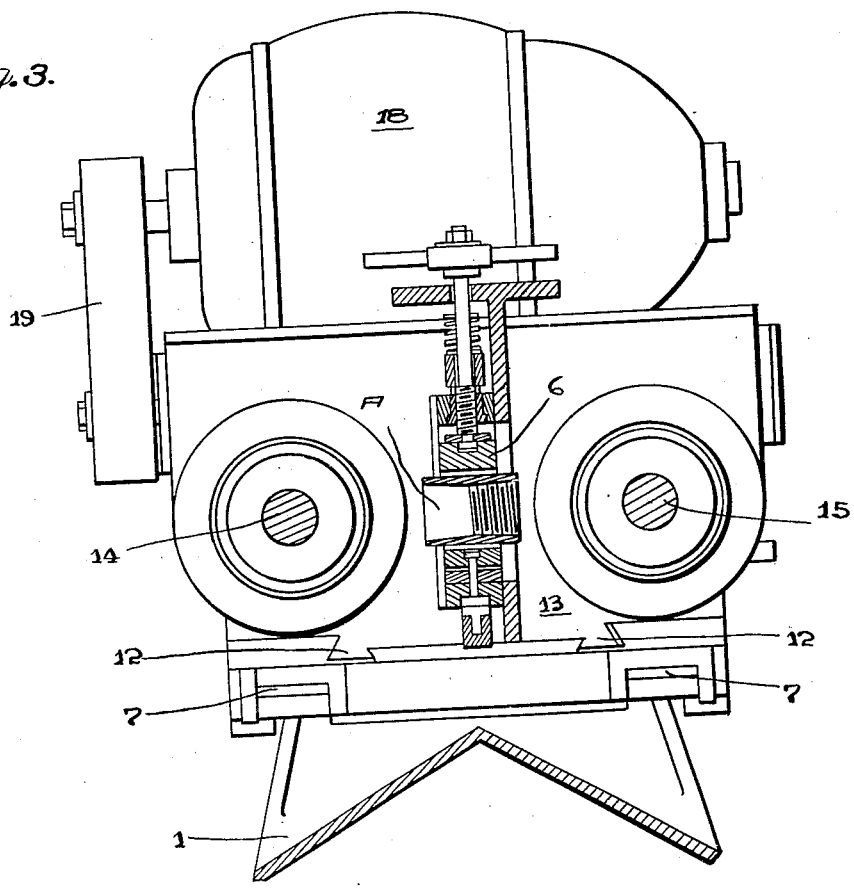
Figure 4:
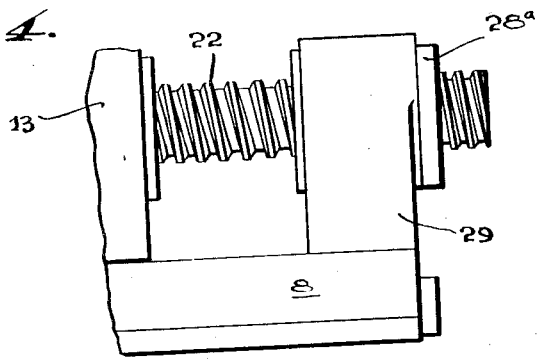

The invention relates to a coupling threading machine and particularly to mechanism for advancing and retracting the carriage. It is illustrated in connection with a machine having two spindles and a particular turret or coupling carrier (shown and claimed in my copending application dated March 5, 1934, Serial No. 714,086), but it will be understood that the invention is equally applicable to a single spindle machine or to a machine having other types of turrets or work carriers. The invention has for its principal objects the provision of improved means for giving the carriage a quick advance to tapping position and a similar quick return in conjunction with independent means for giving the carriage its threading or tapping feed after its quick advance. A further object is to provide improved means for giving the tapping feed mechanism a quick reverse movement to starting position after the tapping cutters have been collapsed and while the carriage is being returned to starting position by the means which gave its quick movement to tapping position. A further object is the provision of a simple, reliable machine by means of which production is materially increased, due to the quick advance and return of the spindle carriage and to the fast reverse movement of the tap feeding mechanism. The invention is illustrated in the accompanying drawings, wherein:

Figure 1 is a side elevation of a coupling tapping machine embodying the invention. Fig. 2 is a plan view. Fig. 3 is a section on the line III—III of Fig. 1. And Fig. 4 is a side elevation showing a modification.

Referring to the drawings, 1 is the base or bed of the machine carrying at one end the turret 2 having four chucks 3, 4, 5 and 6 for gripping the couplings A to be tapped. The turret is mounted for rotation step by step around the center B, the rotating means, as well as the indexing means, being well known in the art and require no illustration. This type of turret has particular advantage with a two spindle machine, such as is illustrated here, but constitutes the subject matter of the separate application heretofore referred to. The chucks for carrying the couplings are of the self-centering type more fully disclosed in another copending application, Serial No. 714,085 dated March 5, 1934, but it is immaterial in so far as the present invention is concerned, what type of turret or chuck is used or whether the machine has one spindle or a plurality of spindles.

Mounted for movement longitudinally of the bed on suitable guides 7 (Fig. 3) is a slide member 8. This member is moved back and forth by means of a fluid operated ram, including the oil cylinder 9 secured to the bed and the plunger 10 secured at its end to a lug 11 projecting from the bottom of the slide member. The mechanism gives the carriage and spindles (which are mounted on the slide member as later described) their rapid movement of advance to bring the taps to operating position, and also to retract such parts to starting position after the tapping operation. When in advanced position, the end of the slide member 8 engages the end wall of the base 1, so that after this engagement of the slide member, such member, and the parts carried thereby, are held firmly in this position during the tapping operation by the pressure in the oil cylinder. The parts 9, 10 and 11 are, for the purpose of clearness in illustration, shown more or less diagrammatically. It will also be understood that the operation of the ram is controlled by suitable valves, not shown, whose operation is in practice timed to meet requirements and made automatic.

Mounted for movement longitudinally of the bed on suitable guides 12 (Fig. 3) is the carriage 13 of the machine, such carriage having journalled therein the pair of parallel work spindles 14 and 15 provided with the taps 16 and 17. These spindles are driven from an electric motor 18 through the intermediary of suitable reduction gearing including gearing in the casing 19, a worm 20 in the casing 21, and a pair of worm wheels 21a keyed to the spindles.

Swivelled in the carriage is the lead screw 22 which gives the carriage its feed during the tapping operation, as later described. This screw is driven from the spindle 15 through the intermediary of the gears 23 and 24 on the countershaft 25, the gear 26 on the spindle, and the gear 27 keyed to the end of the lead screw. The lead screw is threaded through a nut 28 swivelled in a bearing 29 carried by the slide member 8. The nut has keyed to it a worm wheel 30 engaged by a worm 31 secured to the drive shaft of an electric motor 32 mounted on the slide member. The motor 32, and the gearing for driving the nut, come into play in retracting the spindles after the tapping operation, the motor being non-rotative during the tapping operation, so that the nut is held against rotation by the worm gear during the forward movement of the carriage.

When the hydraulic ram 9, 10 moves the slide member 8 forward to bring the spindles to the tapping position of Fig. 1, the carriage 13 is also moved forward by reason of the engagement of the nut 28 (carried by the slide member) with the lead screw. The motor 18 is at this time nonrotative, so that the spindles and lead screw are not driven. The carriage is, in this manner, given a quick movement of advance to tapping position, and at the end of such movement, the end wall of the slide member 8 takes against the end wall of the bed, as heretofore explained, and is held in this position by the pressure of the liquid in the cylinder 9. The rotation of the motor 18 is now started, driving the spindles 14 and 15 and the lead screw 22, which gives the carriage a forward movement at the speed required for tapping. When the couplings are tapped, the actuation of a suitable limit switch stops the rotation of the motor. At the same time, the taps 16 and 17 are collapsed, the ram 9, 10 is reversed, and the motor 32 is rotated to drive the swivelled nut 28 and move the lead screw to the rear, so that during the quick backward movement of the slide member 8 and the carriage 13, the carriage is given a backward movement relative to the slide member, thus bringing the carriage and lead screw to their starting positions, the operation of the motor being stopped at this time by a limit switch.

Fig. 4 illustrates a modification in which the nut 28a is fixed to the slide member 8 instead of being mounted for rotation, thus dispensing with the motor 32 and mechanism for rotating the nut. With this construction, the carriage is retracted by rotating the motor 18 backward. This is a slower method of retracting the carriage, and it can not be brought back to starting position while the ram 9, 10 is moving the slide member 8 back to starting position. The construction involving the use of the swivelled driven nut 28, therefore, is preferable since it materially increases the capacity of the machine.

It will be understood that the invention is not limited to the use of the fluid operated ram for giving the slide member 8 its quick movement of advance and return, as any other suitable means may be substituted for accomplishing this result. It will be further understood that the construction involving the use of the lead screw and spindle driven by one motor in combination with the swivelled nut driven by a second motor for giving a quick return is not limited to use on the particular machine shown, but may be employed to advantage in any type of machine tool in which a rapid return of the tool carriage is desirable.

What I claim is:

1. In combination in a coupling threading machine, a bed, a slide member and carriage slidably mounted one upon the other for relative movement in a direction longitudinally of the bed and both mounted on the bed for movement longitudinally thereof, a spindle provided with a tap journalled on the carriage with its axis of rotation parallel with the line of movement of the slide member and the carriage, a lead screw swivelled in the carriage, a feed nut carried by the slide member engaging said screw, means for moving the slide member longitudinally of the bed, gearing between the spindle and lead screw, and a motor in driving relation with one of the two last mentioned members.

2. In combination in a coupling threading machine, a bed, a slide member and carriage slidably mounted one upon the other for relative movement in a direction longitudinally of the bed and both mounted on the bed for movement longitudinally thereof, a spindle provided with a tap journalled on the carriage with its axis of rotation parallel with the line of movement of the slide member and the carriage, a lead screw swivelled in the carriage, a feed nut carried by the slide member engaging said screw, means for moving the slide member longitudinally of the bed to tapping position where it is positively stopped and for holding it in such position for the tapping operation, gearing between the spindle and lead screw, and a motor in driving relation with one of the two last mentioned members.

3. In combination in a coupling threading machine, a bed, a slide member and carriage slidably mounted one upon the other for relative movement in a direction longitudinally of the bed and both mounted on the bed for movement longitudinally thereof, a spindle provided with a tap journalled on the carriage with its axis of rotation parallel with the line of movement of the slide member and the carriage, a lead screw swivelled in the carriage, a feed nut swivelled on the slide member engaging the screw, a motor having driving engagement with the nut and operable to move the lead screw and carriage to the rear, means for moving the slide member longitudinally of the bed, gearing between the spindle and the lead screw, and a second motor in driving relation with one of the two last mentioned members.

4. In combination in a coupling threading machine, a bed, a slide member and carriage slidably mounted one upon the other for relative movement in a direction longitudinally of the bed and both mounted on the bed for movement longitudinally thereof, a spindle provided with a tap journalled on the carriage with its axis of rotation parallel with the line of movement of the slide member and the carriage, a lead screw swivelled in the carriage, a feed nut carried by the slide member engaging said screw, means for moving the slide member longitudinally of the bed, gearing between the spindle and lead screw, a motor, and connections whereby the lead screw and spindle are driven from the motor.

5. In combination in a coupling threading machine, a bed, a slide member and carriage slidably mounted one upon the other for relative movement in a direction longitudinally of the bed and both mounted on the bed for movement longitudinally thereof, a spindle provided with a tap journalled on the carriage with its axis of rotation parallel with the line of movement of the slide member and the carriage, a lead screw swivelled in the carriage, a feed nut swivelled on the slide member engaging the screw, a motor having driving engagement with the nut and operable to move the lead screw and carriage to the rear, means for moving the slide member longitudinally of the bed, gearing between the spindle and lead screw, a second motor, and connections whereby the lead screw and spindle are driven from the second motor.

6. In combination in a machine tool, a support, a carriage slidably mounted on the support for movement longitudinally thereof, a spindle provided with a tool journalled on the carriage with the axis of rotation parallel with the line of movement of the carriage, a lead screw swivelled in the carriage, a feed nut swivelled on the support engaging the screw, a motor in driving relation with the nut, and a second motor in driving relation with the spindle and lead screw.

7. In combination in a machine tool, a support, a carriage mounted on the support for movement longitudinally thereof, a spindle provided with a tool journalled on the carriage with its axis of rotation parallel with the line of movement of the carriage, a lead screw member, a feed nut member engaging the screw member, one of such members being swivelled on the carriage and the other on the support, a motor in driving relation with the member swivelled on the support, a second member in driving relation with the member swivelled on the carriage and a connection for driving the spindle from one of said motors.

R. L. HIBBARD.